(12) United States Patent
Carr

(10) Patent No.: US 11,717,733 B2
(45) Date of Patent: Aug. 8, 2023

(54) IDENTIFYING THE SWEET SPOT OF A BAT

(71) Applicant: Brian Carr, Cambridge, MA (US)

(72) Inventor: Brian Carr, Cambridge, MA (US)

( * ) Notice: Subject to any disclaimer, the term of this patent is extended or adjusted under 35 U.S.C. 154(b) by 293 days.

(21) Appl. No.: 17/197,089

(22) Filed: Mar. 10, 2021

(65) Prior Publication Data

US 2021/0283476 A1 Sep. 16, 2021

Related U.S. Application Data

(60) Provisional application No. 62/988,419, filed on Mar. 12, 2020, provisional application No. 62/987,411, filed on Mar. 10, 2020.

(51) Int. Cl.
*A63B 60/42* (2015.01)
*G01P 1/00* (2006.01)
*G01P 15/04* (2006.01)

(52) U.S. Cl.
CPC ............... *A63B 60/42* (2015.10); *G01P 1/06* (2013.01); *G01P 15/04* (2013.01); *A63B 2220/40* (2013.01); *A63B 2220/833* (2013.01); *A63B 2225/74* (2020.08)

(58) Field of Classification Search
CPC ............... A63B 60/42; A63B 2220/40; A63B 2220/833; A63B 2225/74; G01P 1/06; G01P 15/04
See application file for complete search history.

(56) References Cited

U.S. PATENT DOCUMENTS

| 4,886,267 A | 12/1989 | Licciardi | |
| 5,269,177 A * | 12/1993 | Miggins | ................. A63B 60/42 73/65.03 |
| 5,672,809 A * | 9/1997 | Brandt | ..................... G01N 3/52 73/65.03 |
| 5,868,578 A | 2/1999 | Baum | |
| 6,558,278 B2 | 5/2003 | Bunn | |
| 2004/0182131 A1 * | 9/2004 | Pringle | .................... G01N 3/48 73/12.09 |

(Continued)

FOREIGN PATENT DOCUMENTS

| EP | 1450151 A2 * | 8/2004 | ............. A63B 53/04 |
| WO | WO2009108708 | 12/2009 | |

OTHER PUBLICATIONS

ISR/WO of PCT/US21/21601.

(Continued)

*Primary Examiner* — Francis C Gray
(74) *Attorney, Agent, or Firm* — Anderson Gorecki LLP

(57) ABSTRACT

A test fixture for identifying the sweet spot of a bat suspends the bat in a vertical orientation via a fixed pivot point and limits rotational movement of the bat to a single plane. A pendulum with an impact mass is caused to contact the bat at various locations along the barrel of the bat at a fixed velocity. Rotational movement of the impact mass is limited to the single plane. Peak acceleration is measured proximate to the handle of the bat. The sweet spot is identified based on measured minimum peak acceleration. For example, if there is a single measured minimum peak acceleration then the corresponding contact location at the barrel is the sweet spot. If there are multiple measured minimum peak acceleration instances then a center or average contact location of those instances in identified as the sweet spot.

23 Claims, 19 Drawing Sheets

(56) References Cited

U.S. PATENT DOCUMENTS

2009/0221388 A1\* 9/2009 Giannetti .......... A63B 69/0002
 473/422
2013/0104870 A1 5/2013 Rizzo
2015/0265893 A1 9/2015 Ledoux, Jr.

OTHER PUBLICATIONS

"Sweet Spot or Sweet Zone? Modal Analysis of a Wooden Baseball Bat for Design Optimization", Semantic Scholar, semanticscholar. org, Nov. 21, 2003 https://pdfs.semanticscholar.org/07a7/9f1bf0acf26ee7bdc4ee8d06ed99629ff038.pdf.

"Measuring the Vibrational Behavior of a Baseball/Softball Bat", Penn State College of Engineering, acs.psu.edu, Mar. 16, 2012 https://web.archive.org/web/20120316082122/https://www.acs.psu.edu/drussell/bats/modal.html.

"Varo Rap Hittable Training Sleeve", Amazon, amazon.com, ASIN: B074M9VSST, Jun. 28, 2018 (date of first review) https://www.amazon.com/Varo-Hittable-Training-Baseball-Authentic/dp/B07PHHHQHM.

\* cited by examiner

IDENTIFYING THE SWEET SPOT OF A BAT

TECHNICAL FIELD

The subject matter of this disclosure is generally related to test equipment, and more particularly to identifying the optimal location on a baseball bat for hitting a baseball.

BACKGROUND

The concept of a "sweet spot" on the barrel of a baseball bat is well known. Hitting a baseball at the sweet spot of the bat is thought to result in an optimal transfer of kinetic energy from the bat to the ball. However, there are different scientific descriptions of the sweet spot. Further, there are multiple techniques for identifying the sweet spot, and different techniques can indicate different locations as the sweet spot. A center of percussion technique places the sweet spot at a location at which a perpendicular impact against a bat attached to a pivot point along the length of the bat does not generate a reactive shock at the pivot point. The absence of reactive shock occurs when the translational and rotational motions cancel at the pivot point. However, it can be difficult to assure that impacts are perpendicular. The barrel-end node of the first bending mode of vibration technique is another way of finding the sweet spot. A node corresponds to a location along the length of the bat that does not vibrate due to impact with a baseball. However, obtaining measurements at the point of contact is problematic.

SUMMARY

In accordance with some implementations an apparatus comprises: a bat support mechanism that supports a bat in a vertical orientation from a contact location proximate to a knob of the bat, the bat support mechanism limiting rotational movement of the bat to a single plane; an impact mass support mechanism that supports an impact mass at a selected elevation relative to the bat, the elevation of the impact mass relative to the bat being adjustable such that a point of contact between the impact mass and the bat along the axial length of the bat is adjustable; and an accelerometer adapted to be temporarily affixed to the bat; whereby a sweet spot of the bat is identifiable by using the accelerometer to measure peak acceleration in response to impact with the impact mass at a constant velocity at different points of contact along the axial length of the bat, the sweet spot corresponding to minimum peak acceleration.

In accordance with some implementations an apparatus for identifying a sweet spot of a bat comprises: a bat support mechanism with a grasping mechanism that supports a bat in a vertical orientation from a contact location proximate to where a handle of the bat meet a knob of the bat, the grasping mechanism comprising a pivot bearing that limits rotational movement of the bat to a single plane; an impact mass support mechanism that supports a pendulum with an impact mass at a selected elevation relative to the bat via a pivot bearing that limits rotation of the pendulum to the single plane, the elevation of the impact mass relative to the bat being adjustable by an elevation control motor such that a point of contact between the impact mass and the bat along the axial length of the bat is adjustable, swinging of the pendulum being initiated by a mass swing motor; an accelerometer adapted to be temporarily affixed to the bat; and an electronic controller in communication with the accelerometer, the elevation control motor, and the mass swing motor, the electronic controller adapted to use the accelerometer to determine peak acceleration in response to impact with the impact mass at a constant velocity at different points of contact along the axial length of the bat, and identify the sweet spot based on minimum peak acceleration.

In accordance with some implementations a method of identifying a sweet spot of a bat comprises: holding the bat in a vertical orientation via a fixed pivot point; limiting rotational movement of the bat to a single plane; at each of a plurality of locations along the axial length of the bat, causing a mass to contact the bat at a fixed velocity and measuring peak acceleration of the bat at a fixed location along the axial length of the bat other than the locations at with the mass contacts the bat; and identifying the sweet spot based on measured minimum peak acceleration.

All examples, aspects, implementations, and features mentioned in this disclosure can be combined in any technically possible way. Other aspects, features, and implementations may become apparent in view of the detailed description and figures.

DETAILED DESCRIPTION

Although the invention will be described in the context of testing baseball bats, the invention is not limited to test equipment for baseball bats. The inventive concepts could be applied to testing of bats for softball, cricket, and other sports, in addition to non-bat sports equipment that is used for striking an object. Further, the inventive concepts are not limited to wooden bats and can be applied to bats made of aluminum and other materials.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
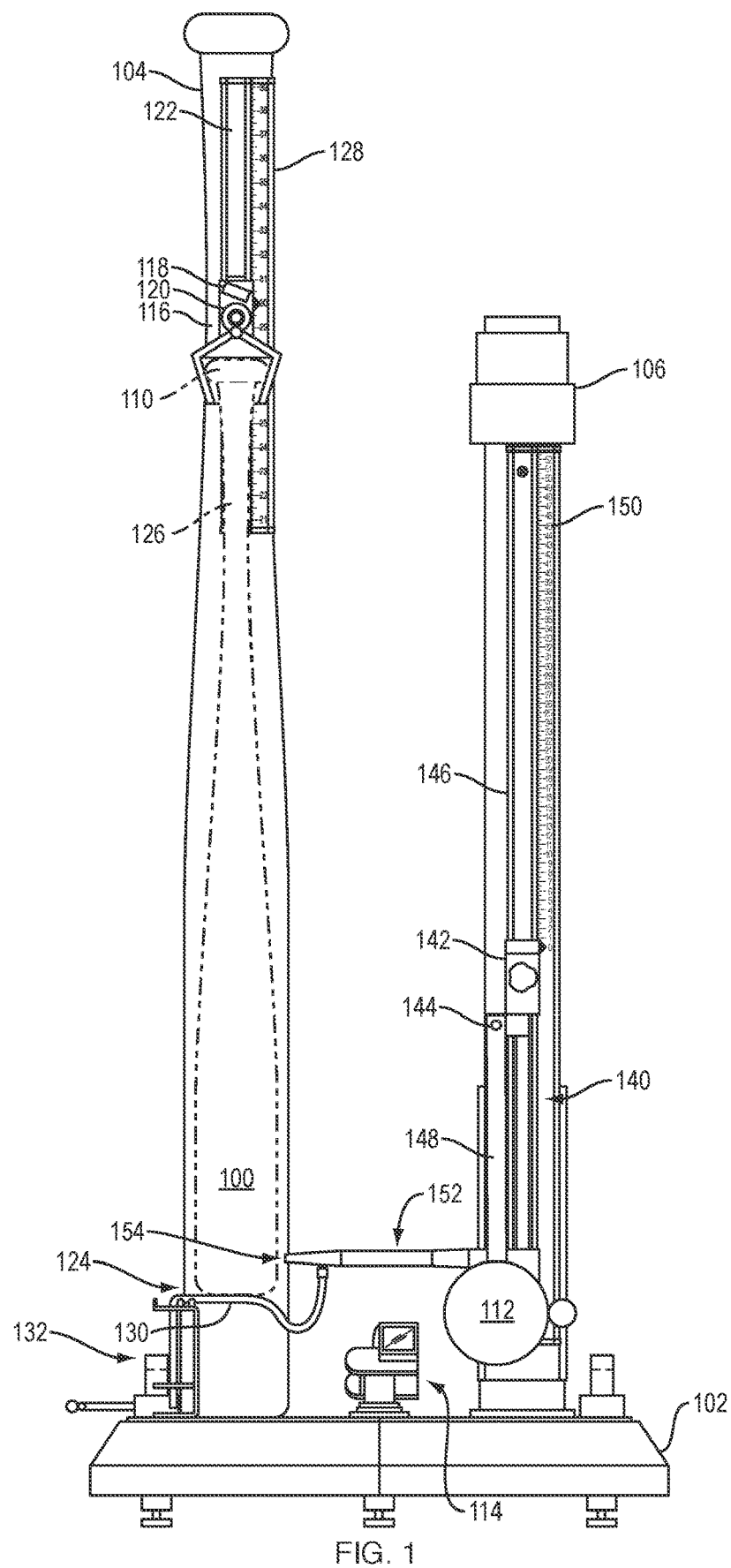
FIG. 1 illustrates an apparatus for identifying the sweet spot of a bat based on acceleration measured at a location other than a location of impact.
Figure 2:
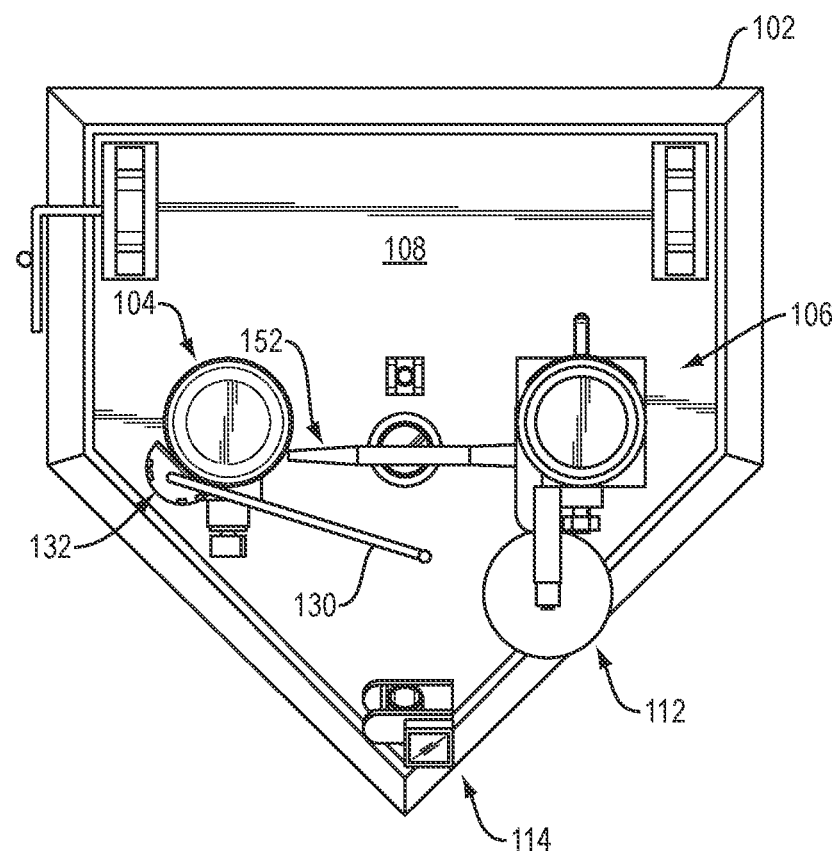
FIG. 2 is a top view of the apparatus of FIG. 1.

FIGS. 1 and 2 illustrate an apparatus for identifying the sweet spot of a bat 100 based on impact responsive acceleration measured at a location other than the impact location. The apparatus includes a base 102, a bat support mechanism 104, and an impact mass support mechanism 106. The bat support mechanism and impact support mechanism are elongated and vertically oriented, perpendicular to a horizontal top flat surface 108 of the base to which they are connected. The bat support mechanism suspends a bat under test vertically from the knob 110. The impact mass support mechanism suspends a spherical impact mass 112 that is used to strike the bat 100 under test to generate an impact response. An accelerometer 114, which may be mounted on the base when not in use, is affixed to the bat under test and used to measure peak acceleration at a location along the length of the bat. As will be explained in greater detail below, the sweet spot is identified based on minimum measured values of peak acceleration for fixed velocity impacts at different points of contact along the axial length of the bat. The base 102 can be situated on a floor, table, or other horizontal surface during a test.

The bat support mechanism 104 includes a bat grasping mechanism 116 attached to a vertical slide 118 at a pivot bearing 120. The slide 118 is adapted to be slidably moved vertically along a track 122 disposed along the length of the bat support mechanism, thereby enabling a grasped bat to be positioned at a predetermined test elevation at which the barrel end of the bat 124 is at a predetermined distance from the top of the base 102. A slide lock mechanism enables the slide 118 to be secured to the track 122 at a selected elevation. The bat grasping mechanism may include a hook, bracket, or finger members, for example, and without limitation, that contact the bat where the handle 126 meets the knob 110. The grasping mechanism secures the distal handle end of the bat to the bat support mechanism. The pivot bearing 120 limits rotation of the bat grasping mechanism, and thus the grasped bat 100, to one plane with rotation centered on the pivot bearing. An elevation reference scale 128 such as an affixed measuring tape on the bat support mechanism indicates the elevation of the distal knob-end of the bat relative to a horizontal member 130 of a bat elevation reference mechanism 132. Thus, the elevation reference scale 128 may indicate a distance that corresponds to the nominal length of the bat, thereby facilitating initial elevational positioning of the bat grasping mechanism.

The impact mass support mechanism 106 includes a pendulum 140 attached to a vertical slide 142 at a pivot bearing 144. The slide 142 is adapted to be slidably moved vertically along a track 146 disposed along the axial length of the impact mass support mechanism, thereby enabling the impact location to be selected by adjusting the elevation of the center of rotation of the pendulum 140. A slide lock mechanism enables the slide to be secured to the track 146 at a selected elevation. The pendulum includes the impact mass 112 and a rod 148. The rod is attached to the pivot bearing 144 and the impact mass is attached to a distal end of the rod opposite the pivot bearing attachment point. The pivot bearing 144 limits rotational movement of the pendulum to one plane with rotation centered on the pivot bearing. The rotational plane of the pendulum 140 is co-planer with the rotational plane of the bat grasping mechanism so the center of mass of the impact mass 112 is aligned with the axis of symmetry of the bat 100, i.e., the axis of symmetry of the bat is in the plane of rotation of the impact mass. As will be explained below, the pivot bearing 144 may have a rotational range limit in one arc of travel to provide a consistent release elevation for the impact mass. An elevation reference 150 such as an affixed measuring tape on the impact mass support mechanism indicates the elevation of the point of contact between the impact mass and the bat measured relative to the distal barrel end 124 of the bat (when the barrel end of the bat is positioned at the test elevation defined by horizontal member 130). Marks or endpoints on the elevation reference may indicate test start and test end elevations in addition to discrete test points, e.g., at 0.5 cm increments. A point of impact reference indicator 152 is connected to the slide 142 and points to the estimated point of impact 154 of the impact mass on the bat 100. More specifically, the distal end of the reference indicator 152 points to the estimated point of impact 154 that is measured by the elevation reference 150.

Figure 3:
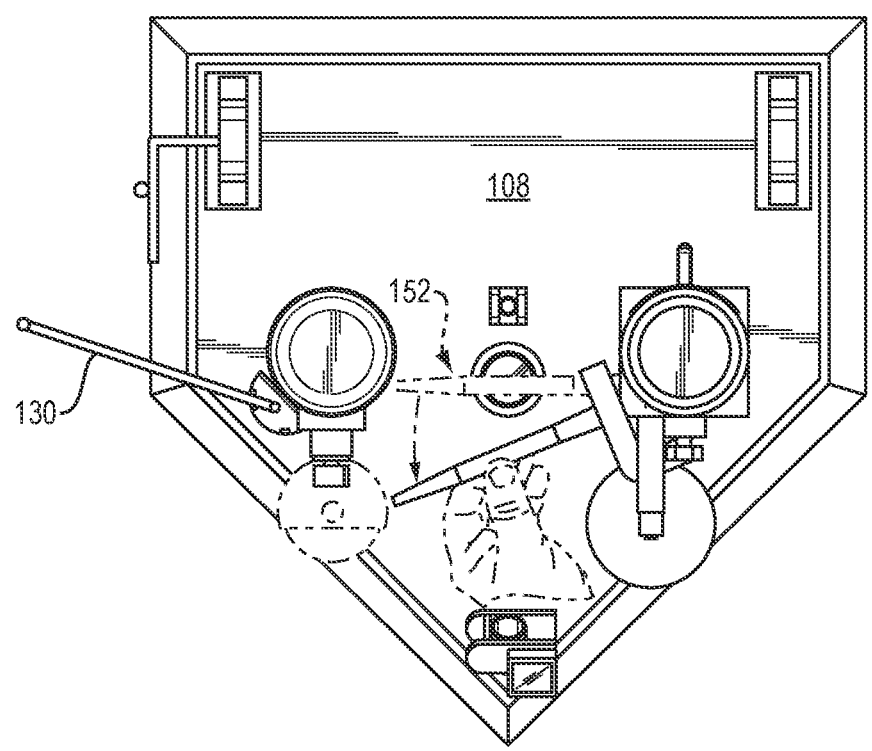
FIG. 3 illustrates retraction of the bat elevation and impact point reference members.

Referring to FIGS. 1 through 3, the bat elevation position reference mechanism 132 is mounted to the base 102. The bat elevation position reference mechanism is rotatable around a vertical axis that is perpendicular to the top 108 of the base. The horizontal member 130 indicates the test elevation at which the barrel end of the bat should be positioned during testing. The grasping mechanism may be initially positioned at an elevation according to the nominal length of the bat using the elevation reference 128. After the bat is attached to the grasping mechanism the horizontal member 130 is rotated into a position adjacent to or just below the barrel end 124 of the bat. The slide 118 is then used to fine tune the bat elevation such that the barrel end of the bat is at the test elevation indicated by the horizontal member. The slide lock is then used to secure the bat at the test elevation and the horizontal member is rotated away from the bat (see particularly FIG. 3). The point of impact reference indicator 152 is also rotated away from the bat so that it does not interfere with the impact mass or the bat during testing.

Figure 4A:
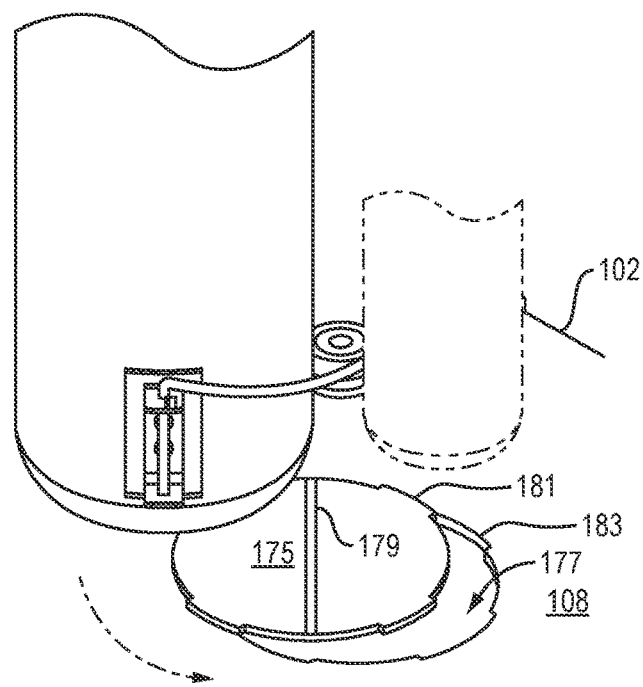
FIGS. 4A and 4B illustrate a rotational alignment feature.
Figure 4B:
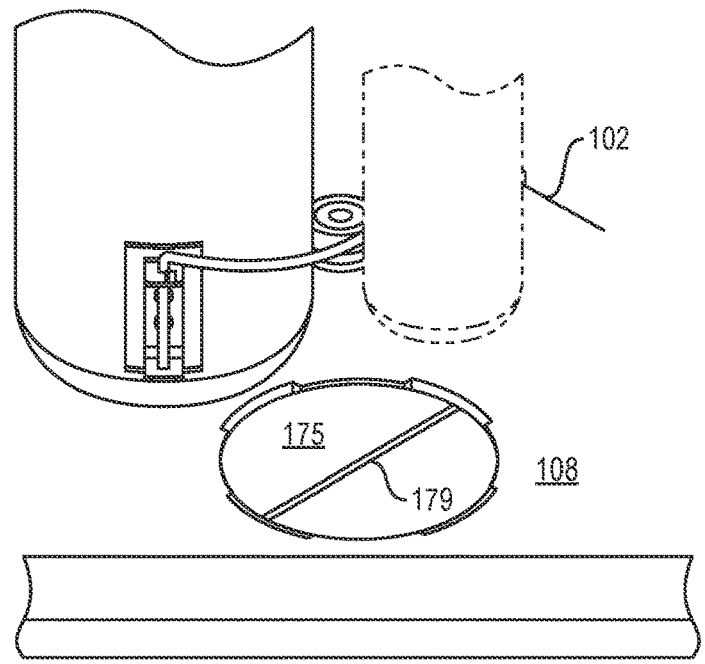

Referring to FIGS. 4A and 4B, the base 102 includes a rotational alignment feature for use with wooden bats. It is well known that wooden bats have an optimal radial impact location according to material strength and weakness determined by the grain of the wood. Baseball bat manufacturers burn a label known as a trademark into the bat to indicate the approximate radial position of the weak location. Generally, the label should be offset by 90 degrees from the point of impact. However, the manufacturer's label may not be accurately located. The rotational alignment feature facilitates rotation of a mounted wooden bat in its axis of symmetry such that the location of impact with the impact mass will be radially optimal, e.g., such that the growth rings of the wood are aligned with the plane of rotation of the impact mass. The accuracy of the placement of the label may be verified and a more accurate mark identified if the label is inaccurately located. The rotational alignment feature includes a circular mirror 175 that fits into a corresponding circular recess 177 in the top 108 of the base directly under the vertically oriented bat. The mirror includes a line 179 that bisects the circular mirror. At least one tab 181 extends outward from the edge of the mirror and fits into corresponding arcuate slot 183 formed in the base. The slots and tabs index the mirror relative to the base and maintain alignment such that the line 179 is in the plane of rotation of the pendulum. The operator rotates the bat around its axis of symmetry until the growth rings at the end of the bat as viewed in the mirror are parallel to the line 179 on the mirror, which is the proper rotational orientation for testing. The label should be offset from the line by 90 degrees. If the label has been improperly placed, then the operator may mark the correct location of the weak spot of the bat.

Figure 5:
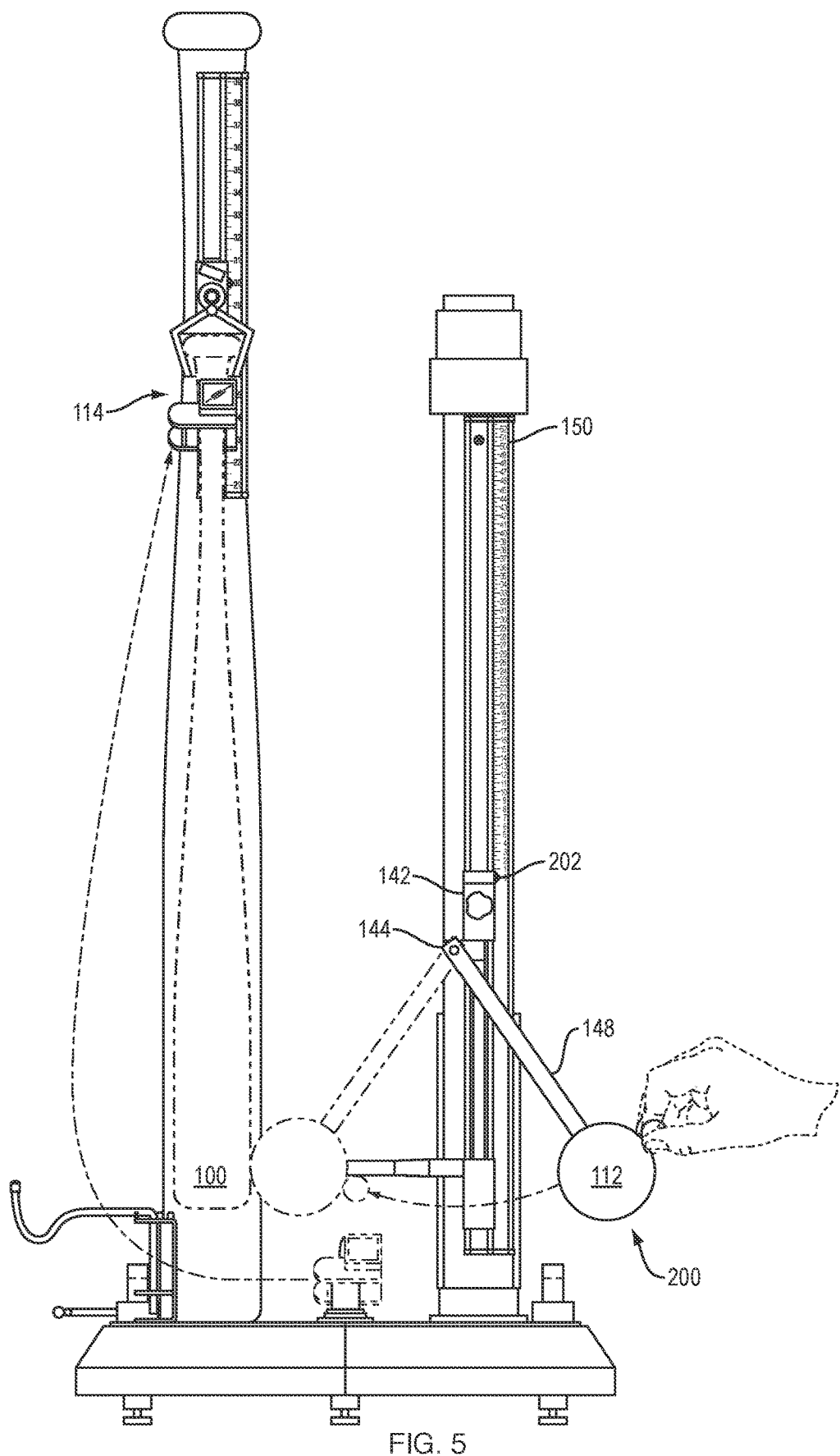
FIG. 5 a single impact of the pendulum mass against the bat under test.

FIG. 5 illustrates a single impact of the impact mass 112 against the bat 100 under test. The bat is shown suspended at the test elevation as described above, i.e., positioned using the grasping member, horizontal member, and slide lock. The impact mass 112 has been suspended at a test start elevation using the slide lock and elevation reference. The accelerometer 114 is affixed to the bat 100. In the illustrated example the accelerometer is affixed to the handle of the bat. The location at which the accelerometer is affixed to the bat is not critical, but the accelerometer should not change position along the axial length of the bat during a test because relative rather than absolute peak acceleration measurements can be used to identify the sweet spot. A node exists along the length of the handle of the bat and peak acceleration may be lowest at the node. However, the accelerometer is not required to be affixed at the node.

In order to cause an impact between the impact mass and the bat the impact mass 112 is rotated away from the bat to a predetermined elevation 200 and then released. The impact mass then accelerates due to gravity, rotating toward the bat. The predetermined elevation 200 of release may be indicated by a mechanical reference, a rotational range limiter of the pivot bearing 144, or a rotational range limiter of the rod 148. The rotational range is only limited in one arc of travel corresponding to the backswing of the mass. The elevation of release is an implementation detail but should be great enough that the released impact mass rotates into contact with the bat and transfers enough kinetic energy to the bat that acceleration measurements can be detected and differentiated. However, the elevation of release should be fixed so that the velocity of the mass 112 at impact with the bat 100 remains constant in successive impacts. A mechanical spring, latch, and trigger mechanism could be used as an alternative to the pendulum, e.g., moving the mass linearly, so that the velocity of the mass at impact with the bat remains constant in successive impacts.

In the illustrated example the impact mass 112 strikes the bat 100 at an angle of approximately 45 degrees relative to the axis of symmetry of the bat. Unlike some known techniques, the angle of impact does not have to be precisely 90 degrees, although it could be 90 degrees. The angle of impact does not have to be 45 degrees and may vary based implementation details such as the distance between the bat support mechanism and impact mass support mechanism, radius of the impact mass, and length of the rod.

As mentioned above, the accelerometer 114 is affixed to the bat during testing. The accelerometer is configured to record maximum (peak) acceleration. When the mass impacts the bat there is a transfer of kinetic energy from the mass to the bat that causes the bat to move relative to the resting position and vibrate at multiple frequencies. Acceleration associated with vibration of the bat is not uniform along the axial length of the bat. In some implementations the accelerometer is configured to display the maximum measured acceleration until the accelerometer is manually reset. That peak acceleration value and the elevation of the impact mass as indicated by the pointer 202 on the slide 142 relative to the elevation reference 150 are recorded after the impact and the accelerometer is reset by the operator to prepare for another impact.

Figure 6:
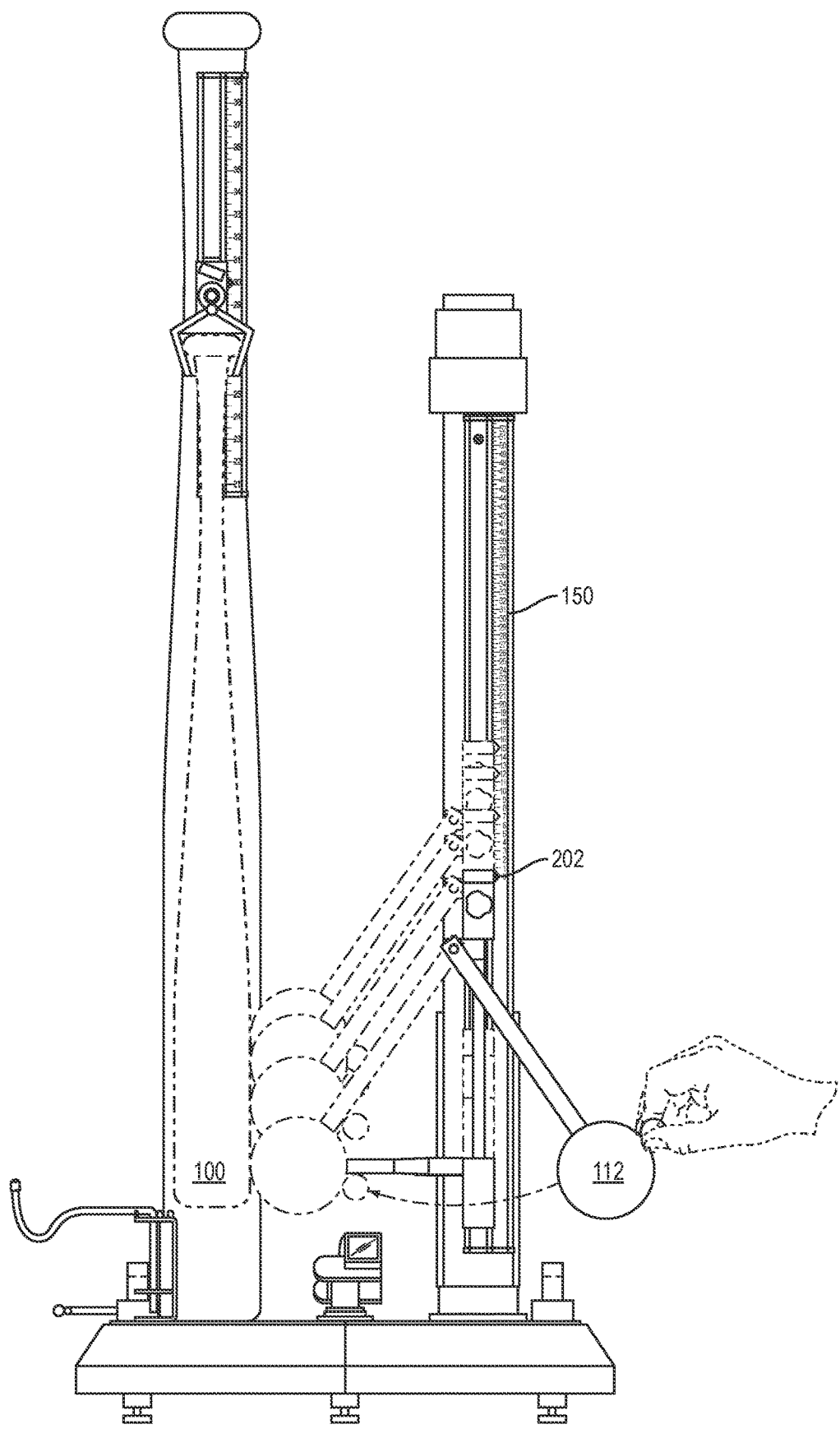
FIG. 6 illustrates a series of impacts of the pendulum mass against the bat under test at different locations along the length of the bat.

FIG. 6 illustrates a series of impacts of the pendulum mass 112 against the bat 100 under test at different locations along the axial length of the bat. Beginning at the test start elevation, the impact mass elevation is increased by a fixed value such as 0.5 cm for each successive impact. The elevation increments are marked on the elevation reference 150. The impact mass is raised by unlocking the slide lock mechanism and using the pointer 202 and elevation reference 150 to reposition the slide. The test start elevation could be closer to the handle of the bat and the impact mass elevation could be lowered by a fixed value for each successive impact. The elevation of the impact mass could even be randomly varied, provided a suitable plot of maximum acceleration versus axial location of impact could be generated from the resulting test data. The operator records the maximum acceleration measured by the accelerometer and impact mass elevation for each impact. The resulting test data may be a table, matrix, or plot of maximum acceleration versus impact elevation.

Figure 7:
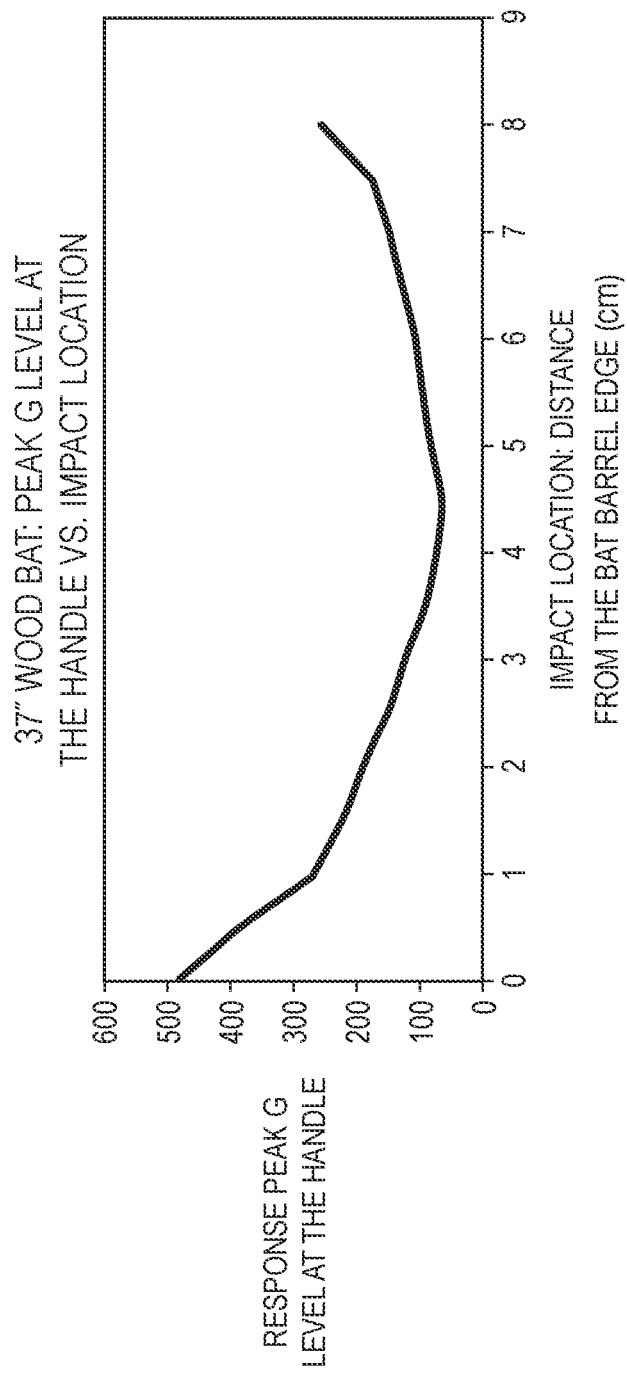
FIG. 7 is a plot of test data for a 37-inch wood bat that illustrates a single minimum peak acceleration value.

FIG. 7 is a plot of test data for a 37-inch wood bat. The plot illustrates a single minimum peak acceleration value of 64 G. The plot represents the test measurements shown below with impact height relative to the barrel end of the bat measured in cm and peak acceleration measured in G. The sweet spot is indicated by 4.5 cm on the elevation reference because 64 G is the minimum recorded value of peak acceleration. If the accelerometer had been placed precisely at the handle node then 0 G may have been recorded for the impact at 4.5 cm from the barrel end of the bat (or other value depending on how the elevational reference is configured). However, use of relative peak acceleration values obviates the need for precise placement of the accelerometer at the node.

| | |
|---|---|
| 0 cm | 485 G |
| 0.5 cm | 389 G |
| 1 cm | 269 G |
| 1.5 cm | 224 G |
| 2 cm | 192 G |
| 2.5 cm | 153 G |
| 3 cm | 127 G |
| 3.5 cm | 94 G |
| 4 cm | 75 G |
| 4.5 cm | 64 G |
| 5 cm | 83 G |
| 5.5 cm | 98 G |
| 6 cm | 108 G |
| 6.5 cm | 129 G |
| 7 cm | 148 G |
| 7.5 cm | 177 G |
| 8 cm | 255 G |

Figure 8:
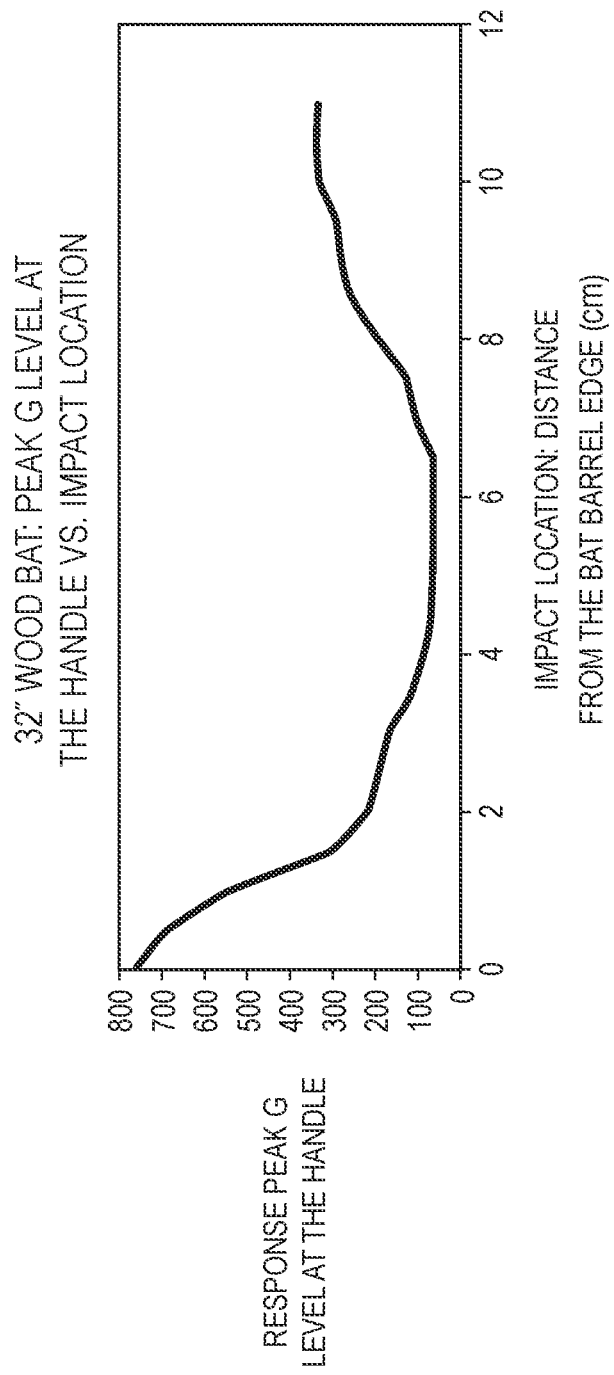
FIG. 8 is a plot of test data for a 32-inch wood bat that illustrates multiple minimum peak acceleration values.

FIG. 8 is a plot of test data for a 32-inch wood bat. The plot illustrates multiple minimum peak acceleration values.

The minimum recorded peak acceleration of 67 G occurs at five impact locations: 4.5 cm, 5 cm, 5.5 cm, 6 cm, and 6.5 cm. The sweet spot is at the center of the minimum peak values, which is 5.5 cm from the barrel end of the bat. The center may be calculated as an average of the minimum recorded peak values.

| | |
|---|---|
| 0 cm | 761 G |
| 0.5 cm | 688 G |
| 1 cm | 540 G |
| 1.5 cm | 302 G |
| 2 cm | 215 G |
| 2.5 cm | 191 G |
| 3 cm | 168 G |
| 3.5 cm | 113 G |
| 4 cm | 84 G |
| 4.5 cm | 67 G |
| 5 cm | 67 G |
| 5.5 cm | 67 G |
| 6 cm | 67 G |
| 6.5 cm | 67 G |
| 7 cm | 105 G |
| 7.5 cm | 125 G |
| 8 cm | 190 G |
| 8.5 cm | 251 G |
| 9 cm | 277 G |
| 9.5 cm | 289 G |
| 10 cm | 331 G |
| 10.5 cm | 338 G |
| 11 cm | 332 G |

Figure 9:
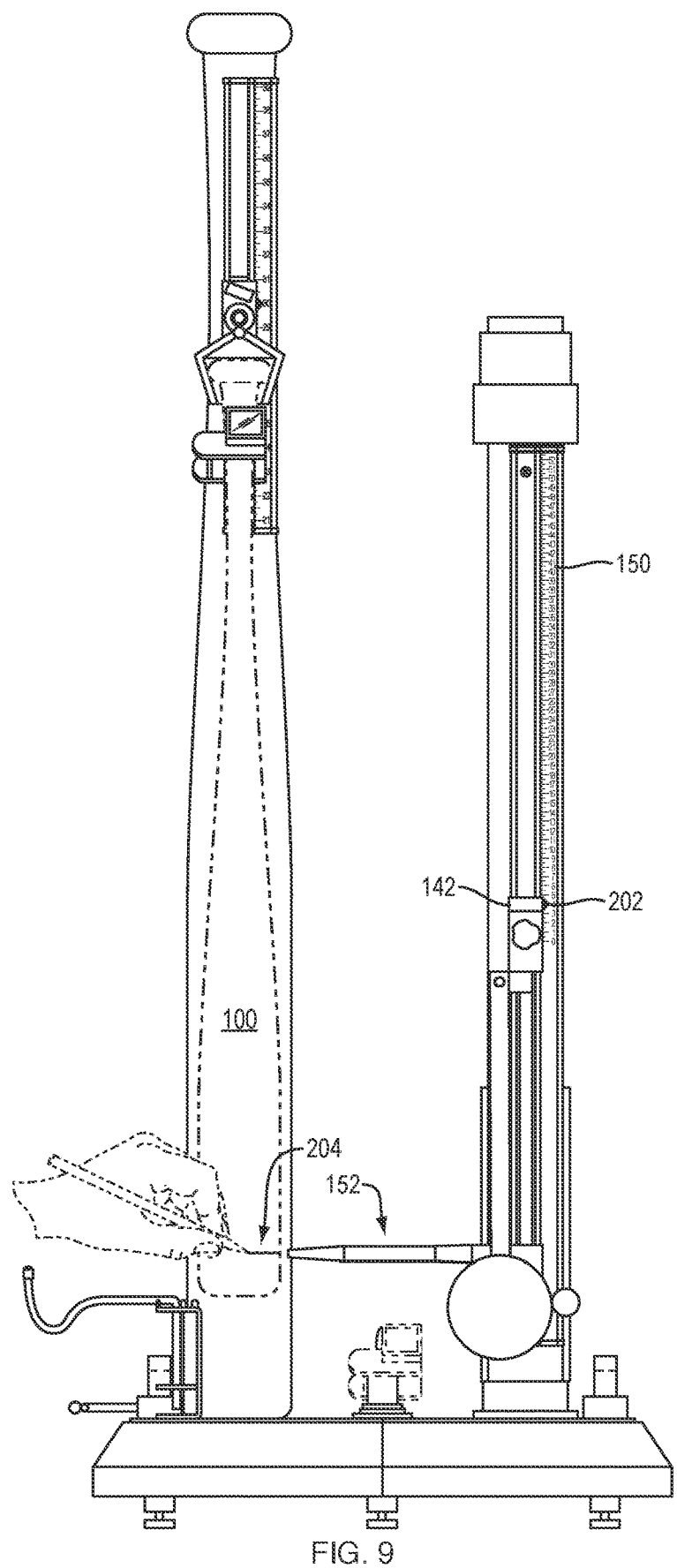
FIG. 9 illustrates use of the impact point reference member to facilitate marking the identified sweet spot.

FIG. 9 illustrates use of the impact point reference member 152 to facilitate accurate marking of the identified sweet spot. After determining the elevation of the sweet spot as described above the operator uses the slide 142 to relocate the pendulum to the elevation of the sweet spot, e.g., the elevation at which a single lowest maximum acceleration was recorded. More specifically, the slide is used to set the pointer 202 to the increment on the elevation reference 150 corresponding to the sweet spot and the slide lock is engaged. For the data of FIG. 7 the pointer 202 would be aligned with 4.5 cm on the elevation reference 150. The point of impact reference indicator 152 which is connected to the slide is then rotated into position to point to the point of impact corresponding to the identified sweet spot. In other words, the distal end of the reference indicator points to the sweet spot 204. The operator then marks the sweet spot 204, e.g., with a pencil or marker.

Figure 10:
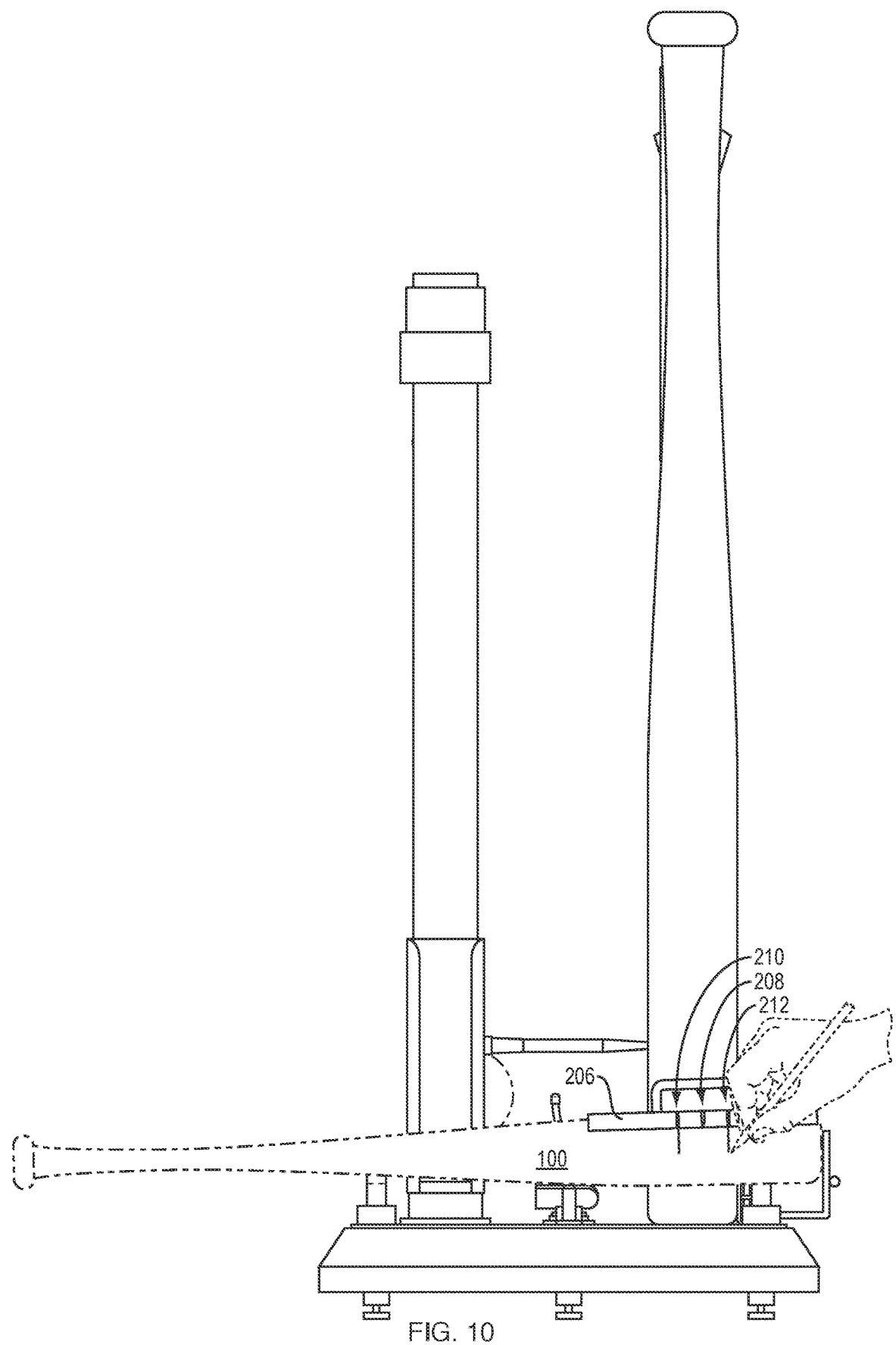
FIG. 10 illustrates use of a template to mark a sweet range on the bat.

FIG. 10 illustrates use of a template 206 to mark a sweet range on the bat 100. In some implementations the template is flexible and conforms to the shape of the barrel of the bat when positioned thereon. In some implementations the template is rigid. In some implementations the template is semi-cylindrical, while in other implementations the template has multiple planar surfaces that meet at fixed angles. Regardless of the shape and rigidity, the template includes a center reference line 208 that is aligned with the sweet spot line 204 (FIG. 9) marked by the operator as described above. Adjacent reference marks 210, 212 at about 2.5 cm from the center line on the template are then transferred to bat by making corresponding marks with a pencil or marker. The adjacent lines indicate the limits of the sweet range, which could span from 5 cm to 12.5 cm depending on design choice.

Figure 11:
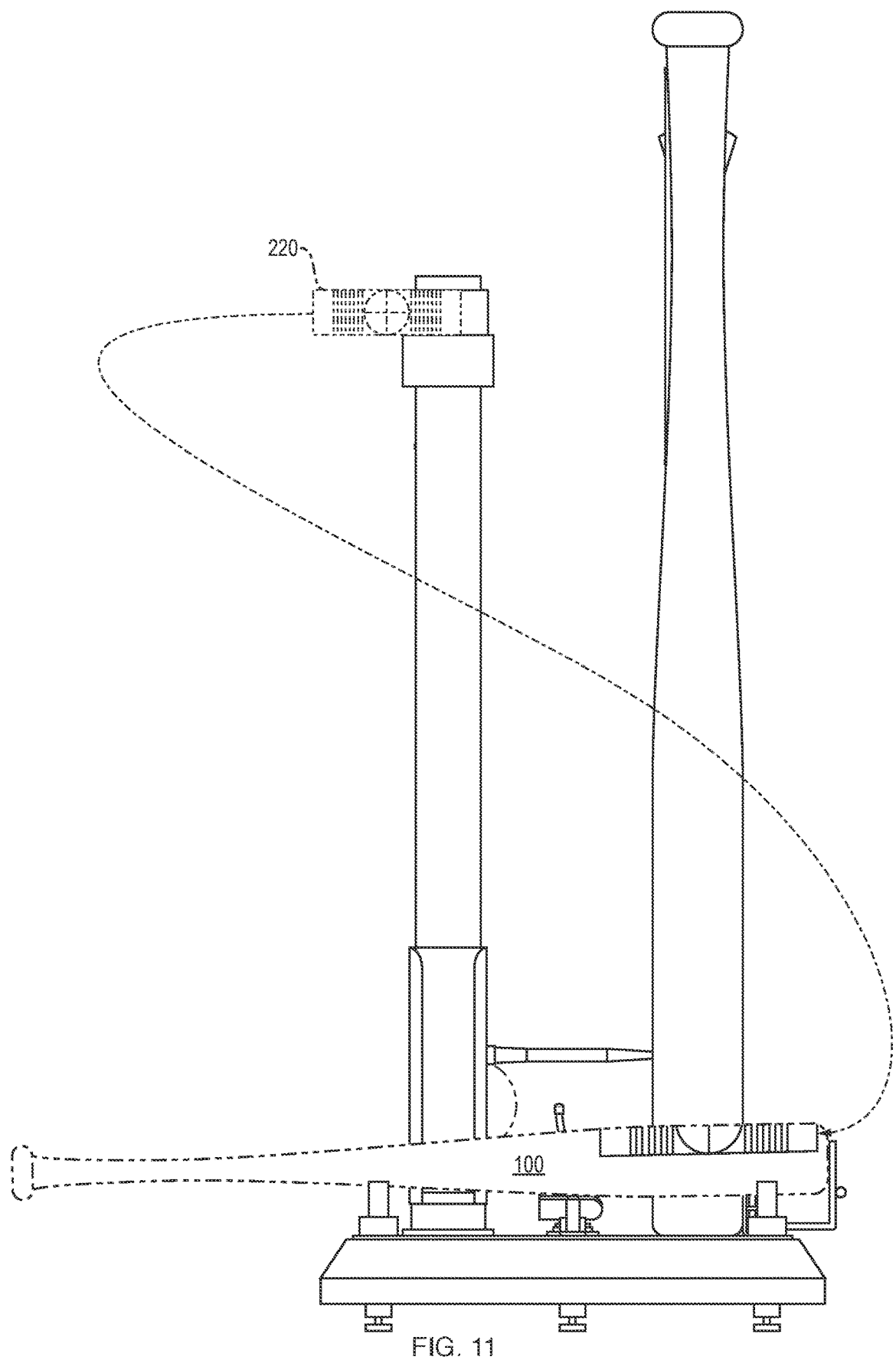
FIG. 11 illustrates application of impact tape to the bat at the sweet range.

FIG. 11 illustrates application of impact tape 220 to the bat 100 at the sweet range. Impact tape is visibly altered where impact occurs, thereby providing a persistent visual indication of where a ball contacts the bat. The impact tape includes an adhesive back and markings that are aligned with the sweet range and sweet spot markings on the bat. The athlete can then determine the point of contact with a baseball relative to the sweet spot and sweet range during use. The impact tape can be replaced when desired.

Figure 12A:
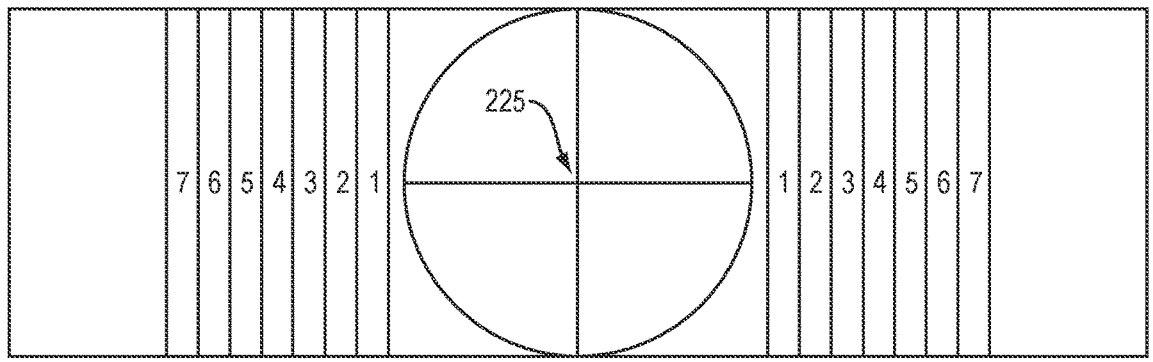
FIGS. 12A and 12B illustrate the impact tape in greater detail.
Figure 12B:
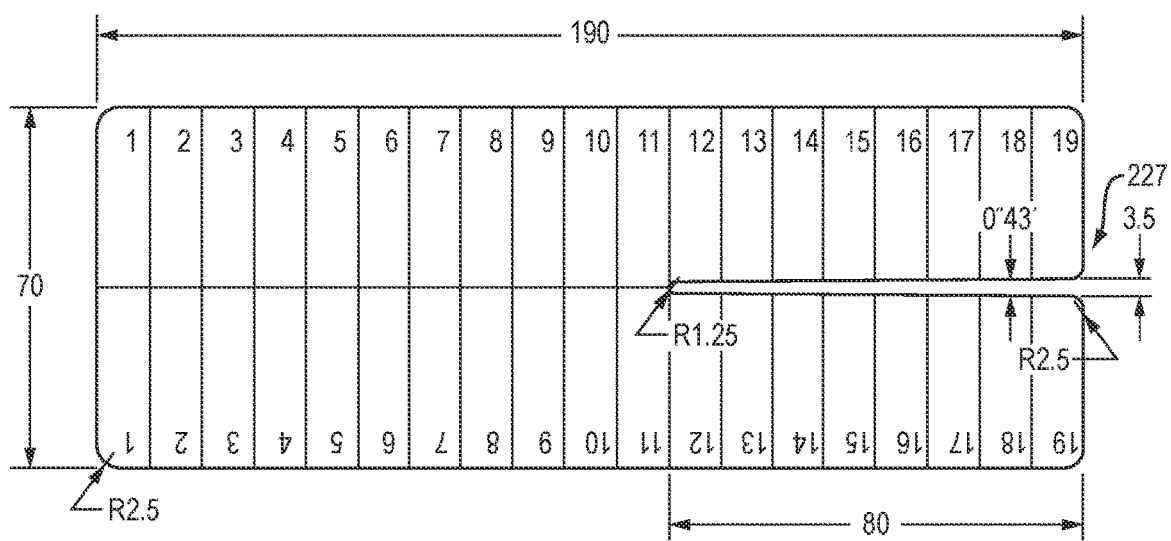

FIGS. 12A and 12B illustrate aspects of the impact tape in greater detail. A center reference 225 is positioned on the sweet spot in some implementations. A circle of about 5 cm in diameter indicates the location of the sweet spot. Graduated zones numbered 1 through 7 at different distances from the sweet spot indicate locations along the length of the bat. In another implementation graduated zones are numbered 1 through 19 and a longitudinal relief cutaway 227 facilitates application to a portion of the barrel of the bat that has a changing diameter.

Figure 13A:
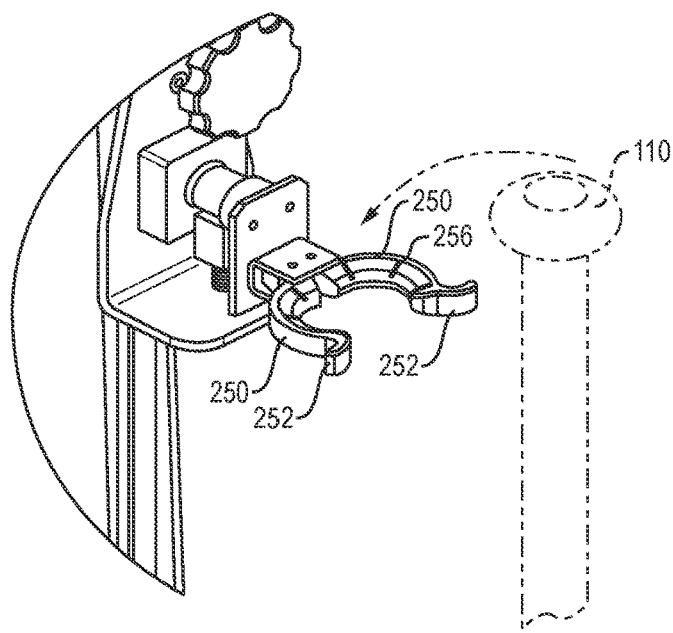
FIGS. 13A, 13B, and 13C illustrate an implementation of the grasping mechanism in greater detail.
Figure 13C:
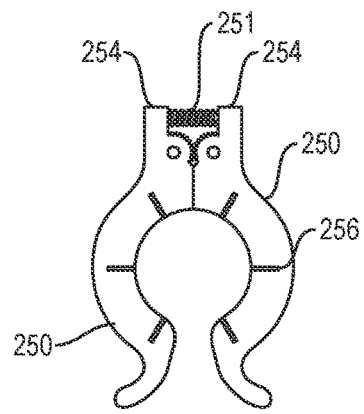
Figure 13B:
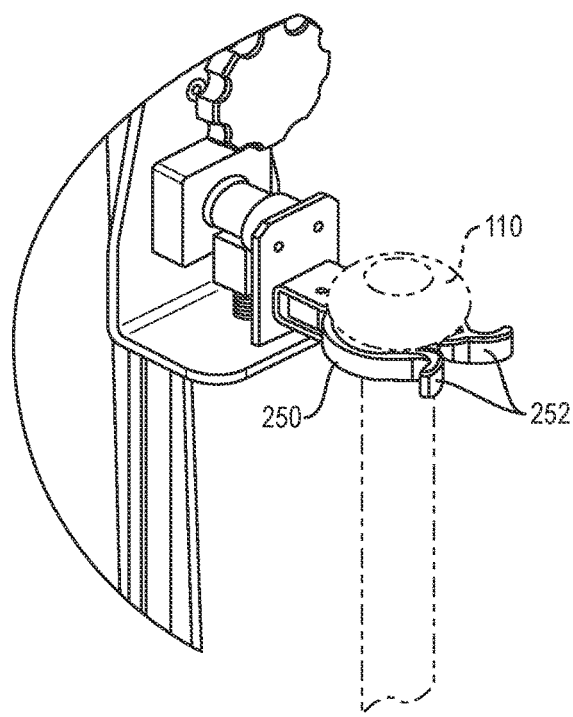
Figure 14:
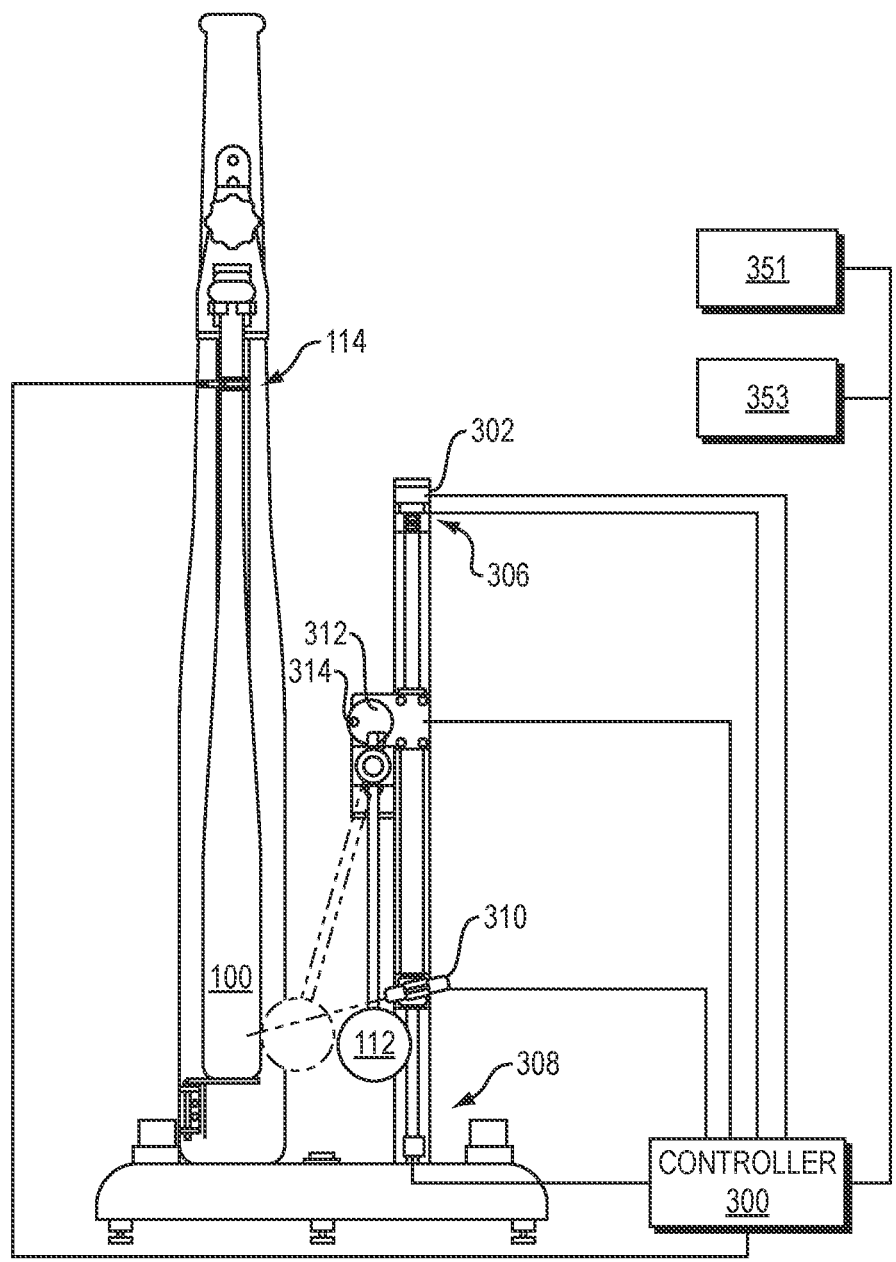
FIG. 14 illustrates a semi-automated implementation of the apparatus for identifying the sweet spot of a bat.

FIGS. 13A, 13B, and 13C illustrate an implementation of the bat grasping mechanism in greater detail. The illustrated implementation is a spring-loaded ring clamp. The ring clamp includes two pivoting arcuate members 250 with reverse-curved outer distal ends 252. A spring 251 pushes inner distal ends 254 apart, thereby pushing the outer distal ends 252 inward toward each other. Pushing a bat handle against the reverse-curved outer distal ends 252 causes the arcuate members 250 to pivot open by counteracting the spring force. The spring causes the arcuate members to pivot back around the handle of the bat as the bat is inserted into the ring defined by the arcuate members. The bat is then supported at the knob by the arcuate members. Protruding ribs 256 formed on the inner surface of the arcuate members where contact is made with the bat help to reduce the surface area of contact against the bat knob 110. The bat knob is rounded, and the cone ribs are linear, thereby reducing surface contact even further. The ribs help to vibrationally isolate the bat from the test apparatus. The spring-loaded ring clamp accommodates a wide range of bat handle diameters.

Referring to FIGS. 14 through 17, sweet spot identification is semi-automated in some implementations by an electronic controller 300 such as a microcontroller, PC, or smartphone with control software. The illustrated implementation further includes an elevation control motor 302, a mass swing motor 304, upper and lower elevation limit switches 306, 308, and a laser pointer 310. Communications links are established between the controller 300 and the accelerometer 114, elevation control motor 302, mass swing motor 304, elevation limit switches 306, 308, and laser pointer 310. The links could be wired or wireless. The accelerometer 114 may provide raw measurements or maximum acceleration readings. In an implementation in which raw acceleration data is provided, the controller 300 identifies and selects the peak acceleration measured for each impact. The elevation limit switches 306, 308 are linked to the controller 300 in order to stop the elevation control motor 302 when a limit position is reached. Inputs from the upper and lower limit switches may be provided to different ports of the controller to distinguish between the upper and lower limits. The elevation control motor 302 may be a stepper motor connected to a drive screw 303.

An operator positions the bat in preparation for a test as already described above. The grasping mechanism is positioned at an elevation according to the nominal length of the bat using the elevation reference. The bat is then attached to the grasping mechanism and the horizontal member is rotated into a position adjacent to or just below the barrel end of the bat. The slide is then used to fine tune the bat elevation such that the barrel end of the bat is at the test elevation indicated by the horizontal member. The slide lock is then used to secure the bat at the test elevation.

The user provides an input to the controller 300 to begin an automated test. In response, the controller causes the elevation control motor 302 to lower the pendulum until the lower limit switch 308 is contacted. Contact with the lower limit switch is signaled to the elevation control motor, which stops lowering the slide and pendulum in response. The lower limit switch may be positioned such that a test is started at the lower limit. Alternatively, the controller may cause the elevation control motor to increase the elevation of the pendulum to a test start elevation set relative to the lower limit. Once the pendulum is set to the test start elevation the controller 300 drives the mass swing motor 304, which rotates a disk 312. A projection 314 extending from the disk proximate to an outer edge of the disk moves with the rotating disk and contacts the pendulum rod 148 at an upper section 149 above the pivot bearing 144. As the projection 314 continues to move with the rotating disk 312, the projection rotates the upper section 149 of the rod toward the bat, which causes the lower portion of the rod 148 and the impact mass 112 to rotate away from the bat. As the upper section 149 of the rod rotates toward the bat, the point of contact between the upper section and the projection 314 moves closer to the upper distal end of the rod until the projection moves beyond the upper distal end and contact is lost. When contact is lost the mass 112 rotates toward the bat due to gravity, impacting the bat at the predetermined location. The impact causes vibration as described above. The accelerometer 114 measures acceleration due to the vibration. A brake or damping mechanism 258 may be implemented to the impact mass to a single contact with the bat. The brake or damping mechanism restricts rotation of the pendulum and helps to return the pendulum back to the vertical starting position to prepare for additional impacts. After the bat has been struck by the impact mass, the bat vibrates and pivots at the pivot bearing of the grasping mechanism. As such, there are linear and rotational acceleration components. Acceleration is measured by the accelerometer and provided to the controller.

The maximum acceleration value is recorded by the controller 300 with the corresponding elevation of the pendulum, which corresponds to an elevation along the axial length of the bat relative to the barrel end. The controller then causes the elevation control motor 302 to increase the elevation of the pendulum by a predetermined fixed value, e.g., 0.5 cm. The controller then causes another impact and records the maximum acceleration value with the corresponding elevation of the pendulum. The process is repeated for a predetermined number of impacts, elevational increments, or elevation range of test.

When maximum acceleration and pendulum elevation have been recorded for the predetermined number of impacts, elevational increments, or elevation range of test, the controller 300 calculates the sweet spot. If there is a single lowest peak acceleration value, then the corresponding pendulum elevation indicates the sweet spot. The controller causes the elevation control motor 302 to lower the pendulum to that elevation. The controller 300 then energizes the laser pointer 310, which illuminates the sweet spot on the bat 100 as specifically shown in FIG. 17. Another user input causes the controller to de-energize the laser pointer and reset for a new test. If there are multiple instances of the lowest maximum acceleration value, then the controller calculates an elevation corresponding to the center of those values and uses the laser pointer to illuminate the calculated elevation as the sweet spot. In some implementations the controller adjusts the elevation of the laser pointer by adjusting elevation of the pendulum to illuminate the upper and lower limits of the sweet spot range. For example, the controller may be responsive to user input to illuminate a selected one of the sweet range lower limit, sweet spot, and sweet range upper limit. In some implementations the controller provides audio and/or visual instructions and/or results to the operator via a loudspeaker 351 and display monitor 353. The controller may also provide an audio and/or visual description of aspects of the test such as indicating that the laser or a pointer is currently designating the sweet range lower limit, sweet spot, or sweet range upper limit.

Figure 18:
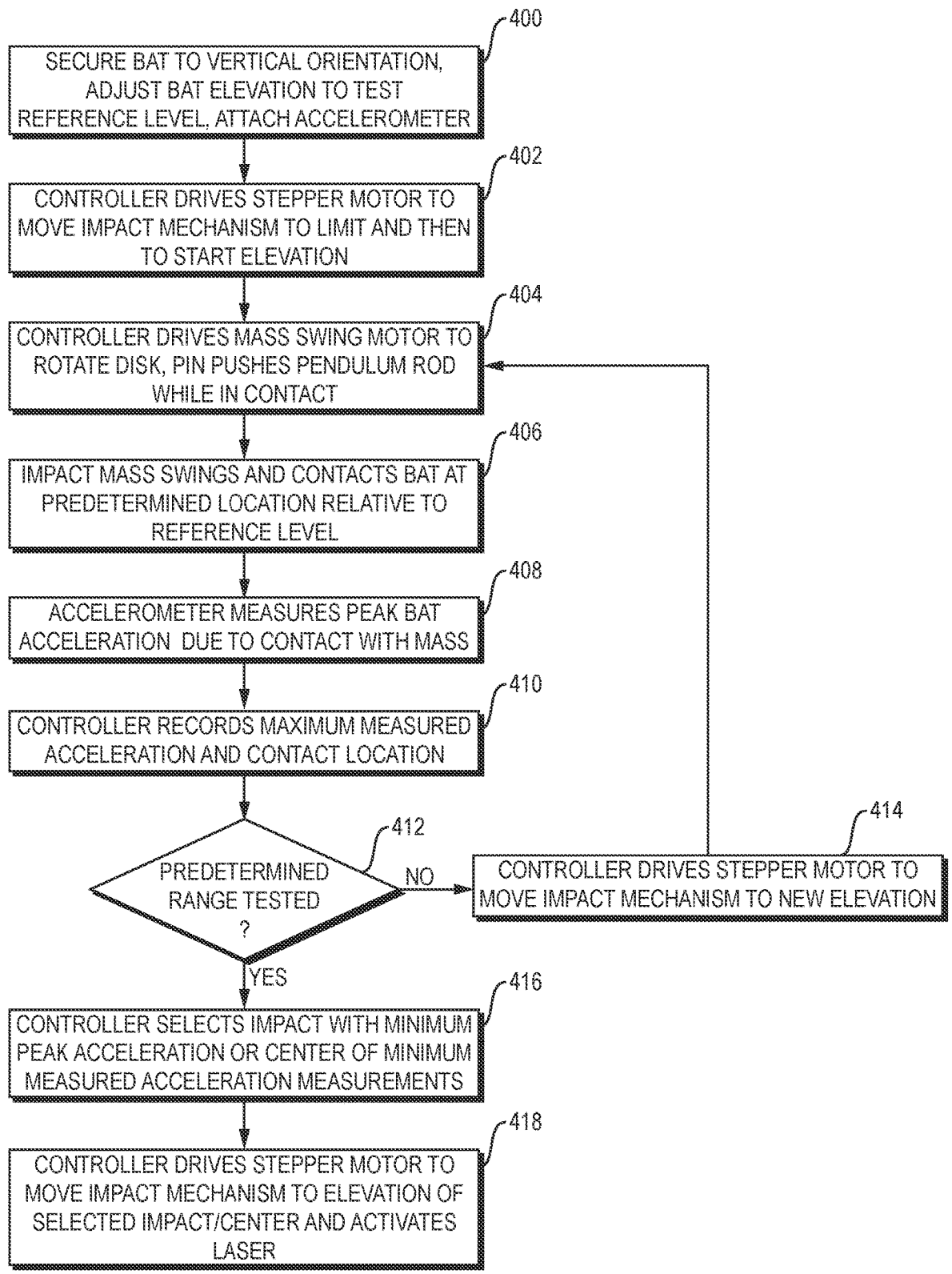
FIG. 18 illustrates a process for semi-automatically identifying the sweet spot of a bat.

FIG. 18 illustrates a process for semi-automatically identifying the sweet spot of a bat. Step 400 is securing the bat in the grasping mechanism in a vertical orientation, adjusting the bat elevation to a test reference level, and attaching the accelerometer. Step 400 may be performed manually. In the vertical orientation the bat is held at one location along the axial length of the bat and is free to move in one plane of rotation. In step 402 the controller drives the mass swing motor to move the impact mechanism, e.g., pendulum, to an upper or lower limit and then to a start elevation (if different than the limit elevation). In step 404 the controller drives the mass swing motor to rotate a disk with a pin or projection that contacts and pushes the upper distal end of the pendulum rod, thereby setting the impact mass to a release elevation. In step 406 the impact mass swings and contacts the bat at a predetermined location relative to a reference level where the barrel end of the bat was positioned manually. In step 408 the accelerometer measures peak bat acceleration due to contact with the impact mass. In step 410 the controller records the maximum measured acceleration and contact location as a data point. If the predetermined range along the axial length of the bat has not been tested as determined by the controller in step 412 then the controller drives the stepper motor to move the impact mechanism to a new elevation as indicated in step 414. The new elevation may be a predetermined fixed distance from the previous elevation. Steps 404, 406, 408, 410 and 412 are then repeated. If the predetermined range along the axial length of the bat has not been tested as determined by the controller in step 412 then the controller selects the impact data point with the minimum peak acceleration or the center of elevation for multiple data points with the minimum peak acceleration as indicated in step 416. The controller then drives the stepper motor to move the impact mechanism to the elevation of the selected data point or center of elevation and activate the laser to illuminate the corresponding sweet spot on the bat as indicated in step 418.

Figure 15:
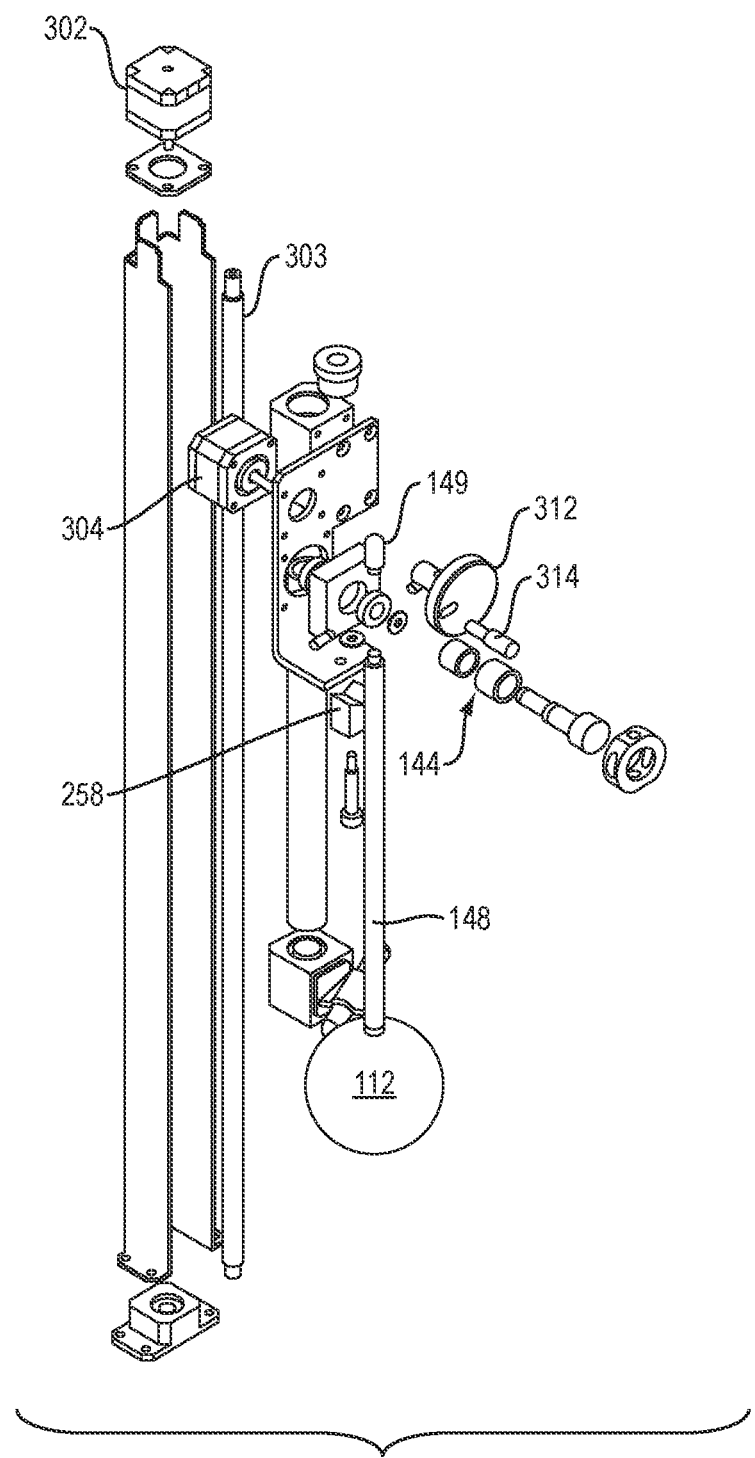
FIG. 15 is an exploded view of the automated mass swing mechanism.
Figure 16:
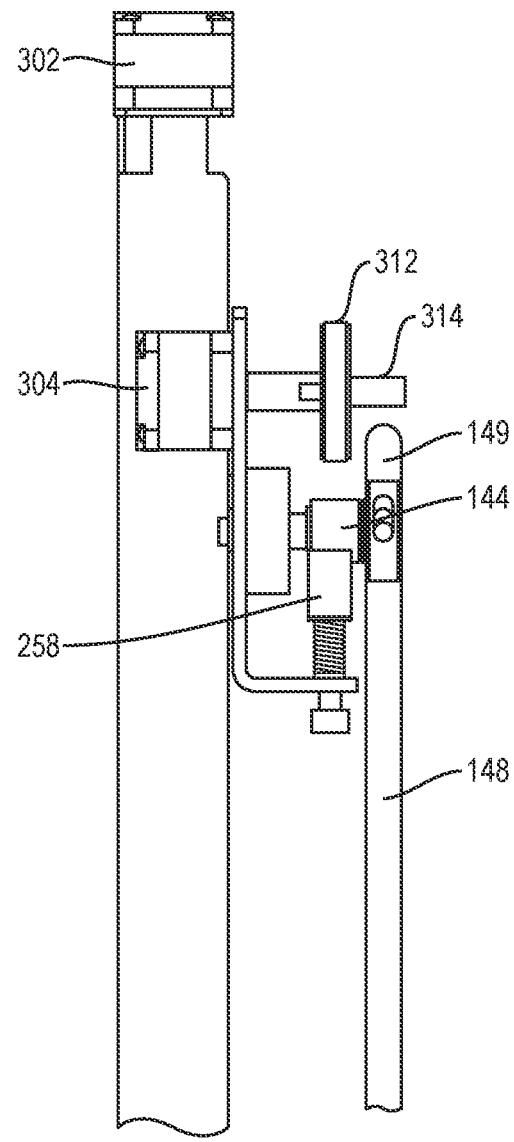
FIG. 16 is a side view of the automated mass swing mechanism.
Figure 17:
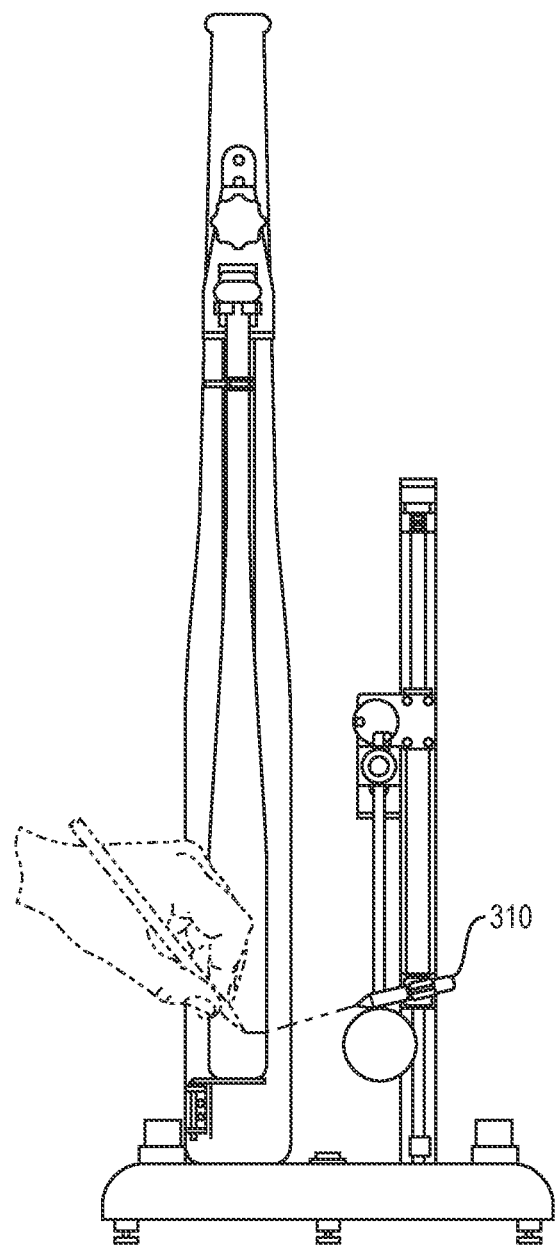
FIG. 17 illustrates use of the laser pointer.
Figure 19:
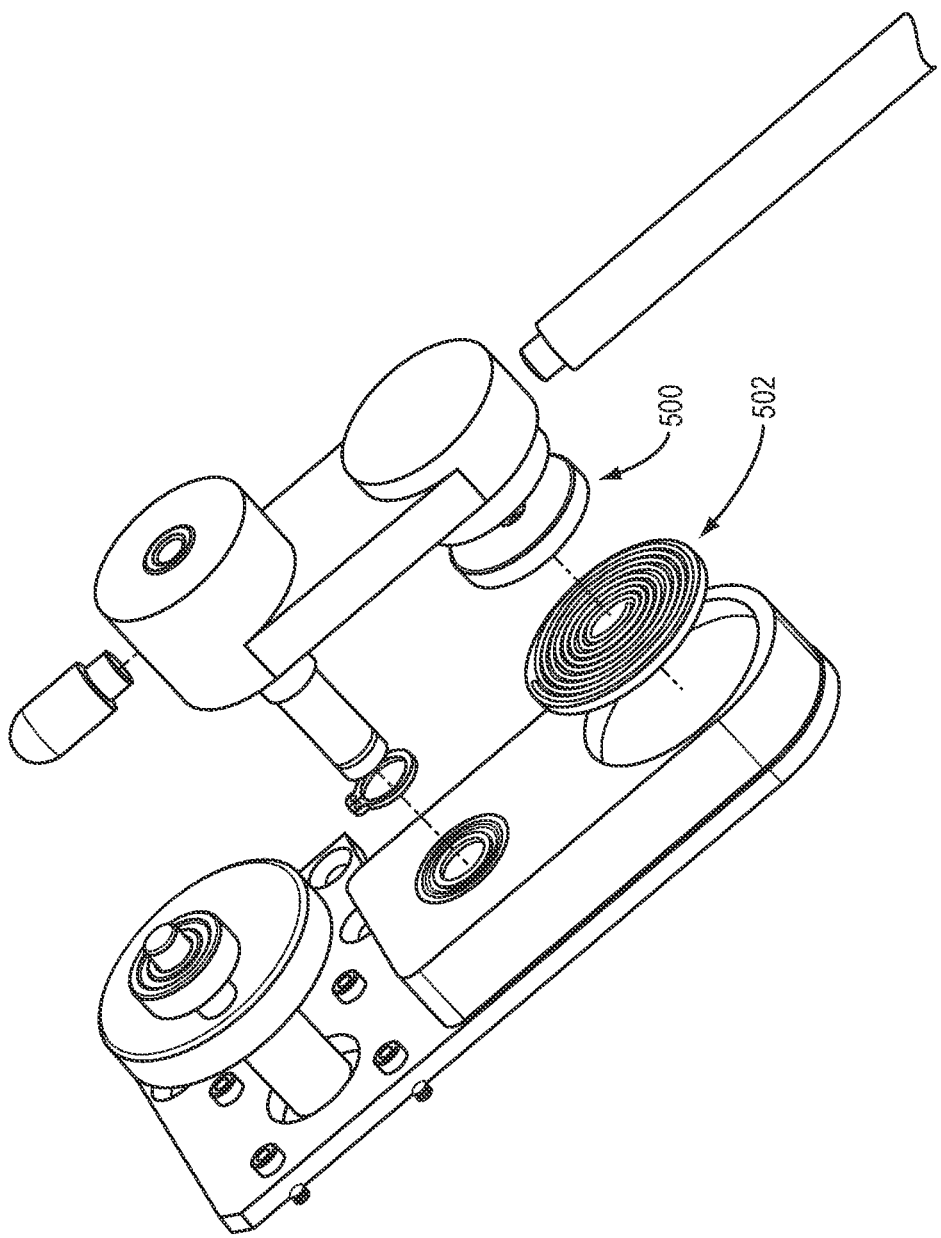
FIG. 19 illustrates a magnetic braking mechanism.

FIG. 19 illustrates a magnetic braking mechanism. A neodymium magnet 500 is attached to the pendulum. An electromagnetic coil 502 is disposed in a position that is fixed and proximate to the magnet when the pendulum is at rest. After the impact mass strikes the bat the coil is energized. The energized coil exerts an attractive force on the magnet, thereby slowing the pendulum and preventing a second impact of the mass on the bat. The magnetic braking mechanism may be implemented in addition to, or in place of, the damping mechanism 258 (FIG. 15).

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus, comprising:
a bat support mechanism that supports a bat characterized by a knob, handle, and barrel in a vertical orientation from a contact location proximate to the knob of the bat, the bat support mechanism limiting rotational movement of the bat to a single plane;
an impact mass support mechanism that supports an impact mass at a selected elevation relative to the bat, the elevation of the impact mass relative to the bat being adjustable such that a point of contact between the impact mass and the bat along the axial length of the bat is adjustable; and
an accelerometer adapted to be temporarily affixed to the handle of the bat;
whereby a sweet spot of the bat is identifiable without modifying the bat by using the temporarily affixed accelerometer to measure peak acceleration at the handle in response to impact with the impact mass at a constant velocity at different points of contact along the axial length of the barrel of the bat, the sweet spot corresponding to minimum peak acceleration.

2. The apparatus of claim 1 wherein the impact mass support mechanism comprises a pendulum with a rod attached to the impact mass, and a limiter that restricts rotation of the pendulum in one arc of travel to define a release elevation for the impact mass.

3. The apparatus of claim 2 wherein the pendulum is attached to a pivot bearing that restricts rotation of the impact mass to the single plane.

4. The apparatus of claim 3 wherein the bat support mechanism comprises a spring-loaded ring clamp and pivot bearing.

5. The apparatus of claim 1 further comprising an electronic controller in communication with the accelerometer, the electronic controller recording an indication of impact location and peak acceleration measured by the accelerometer for each of the different points of contact along the axial length of the bat.

6. The apparatus of claim 5 comprising an elevation control motor in communication with the electronic controller, the electronic controller configured to cause the elevation control motor to relocate the impact mass to each elevation corresponding to each of the different points of contact along the axial length of the bat.

7. The apparatus of claim 6 comprising upper and lower elevation limit switches that indicate limits of elevational travel of the impact mass, the electronic controller configured to determine elevation of the impact mass relative to one of the limit switches in response to actuation of the one of the switches and actuation of the elevation control motor.

8. The apparatus 7 comprising a mass swing motor in communication with the electronic controller, the mass swing motor configured to elevate and release the impact mass.

9. The apparatus of claim 8 comprising a laser pointer in communication with the electronic controller, the electronic controller adapted to identify the sweet sport from the peak acceleration measured by the accelerometer for each of the different points of contact along the axial length of the bat and then cause the laser pointer to illuminate the sweet spot on the bat.

10. An apparatus for identifying a sweet spot of a bat, comprising:
a bat support mechanism with a grasping mechanism that supports a bat in a vertical orientation from a contact location proximate to where a handle of the bat meet a knob of the bat, the grasping mechanism comprising a pivot bearing that limits rotational movement of the bat to a single plane;
an impact mass support mechanism that supports a pendulum with an impact mass at a selected elevation relative to the bat via a pivot bearing that limits rotation of the pendulum to the single plane, the elevation of the impact mass relative to the bat being adjustable by an elevation control motor such that a point of contact between the impact mass and the bat along the axial length of the bat is adjustable, swinging of the pendulum being initiated by a mass swing motor;
an accelerometer adapted to be temporarily affixed to the bat; and
an electronic controller in communication with the accelerometer, the elevation control motor, and the mass swing motor, the electronic controller adapted to use the accelerometer to determine peak acceleration in response to impact with the impact mass at a constant velocity at different points of contact along the axial length of the bat, and identify the sweet spot based on minimum peak acceleration.

11. The apparatus of claim 10 comprising a limiter that restricts rotation of the pendulum in one arc of travel to define a release elevation for the impact mass.

12. The apparatus of claim 11 wherein the grasping mechanism comprises a spring-loaded ring clamp.

13. The apparatus of claim 10 comprising upper and lower elevation limit switches that indicate limits of elevational travel of the impact mass, the electronic controller configured to determine elevation of the impact mass relative to one of the limit switches in response to actuation of the one of the switches and actuation of the elevation control motor.

14. The apparatus of claim 10 comprising a laser pointer in communication with the electronic controller, the electronic controller adapted to identify the sweet sport from the peak acceleration measured by the accelerometer for each of the different points of contact along the axial length of the bat and then cause the laser pointer to illuminate the sweet spot on the bat.

15. The apparatus of claim 10 comprising a mirror with an alignment feature relative to which wood grain of the bat is aligned.

16. The apparatus of claim 10 comprising a bat test elevation reference that indicates test elevation of a barrel end of the bat.

17. The apparatus of claim 10 comprising a template configured to mark a sweet range on the bat.

18. The apparatus of claim 17 comprising impact tape with an adhesive back and markings adapted to be aligned with the sweet range and sweet spot markings on the bat.

19. The apparatus of claim 18 wherein the impact tape comprises a longitudinal relief cutaway.

20. A method of identifying a sweet spot of a bat, comprising:
holding the bat in a vertical orientation via a fixed pivot point;
limiting rotational movement of the bat to a single plane;
at each of a plurality of locations along the axial length of the bat, causing a mass to contact the bat at a fixed velocity and measuring peak acceleration of the bat at a fixed location along the axial length of the bat other than the locations at with the mass contacts the bat; and
identifying the sweet spot based on measured minimum peak acceleration.

21. The method of claim 20 comprising driving a stepper motor to change elevation of the mass relative to elevation of the bat.

22. The method of claim 21 comprising driving a mass swing motor to cause the mass to contact the bat at the fixed velocity.

23. The method of claim 22 comprising identifying the sweet spot based on multiple instances of the measured minimum peak acceleration.

* * * * *